United States Patent [19]

Webster

[11] 3,847,326

[45] Nov. 12, 1974

[54] TOBACCO COMPOSITION

[75] Inventor: Colin James Webster, West Kilbride, Scotland

[73] Assignee: Imperial Chemical Industries Limited, London, England

[22] Filed: Mar. 18, 1971

[21] Appl. No.: 125,811

[30] Foreign Application Priority Data

Mar. 23, 1970 Great Britain.................. 13864/70

[52] U.S. Cl......................... 131/17, 131/9, 131/144
[51] Int. Cl............................................ A24b 15/04
[58] Field of Search............ 131/4, 15, 17, 140–144

[56] References Cited
UNITED STATES PATENTS

| 1,842,266 | 1/1932 | Hicks.................................. 131/4 A |
| 1,954,109 | 4/1934 | Whitaker............................. 131/17 |
| 2,171,986 | 8/1937 | Poetschke........................ 131/15 R |
| 2,460,282 | 2/1949 | Hale.................................. 131/15 R |
| 2,576,021 | 11/1951 | Koree ..................................... 131/2 |
| 2,930,720 | 3/1960 | Finberg................................ 131/17 |
| 3,047,433 | 7/1962 | Bavley et al. ...................... 131/17 R |
| 3,109,436 | 11/1963 | Bavley et al. ...................... 131/17 R |
| 3,120,233 | 2/1964 | Battista et al................... 131/140 C |
| 3,145,717 | 8/1964 | Osborne et al.................. 131/140 C |
| 3,280,823 | 10/1966 | Bavley et al. ............... 131/262 A X |
| 3,312,226 | 4/1967 | Bavley et al. ..................... 131/17 R |
| 3,339,558 | 9/1967 | Waterbury.......................... 131/9 X |
| 3,542,677 | 11/1970 | Theimer et al................ 131/17 R X |
| 3,667,478 | 6/1972 | Waterbury.............................. 131/9 |

FOREIGN PATENTS OR APPLICATIONS 908,439  10/1962  Great Britain....................... 131/17

Primary Examiner—Melvin D. Rein
Attorney, Agent, or Firm—Cushman, Darby & Cushman

[57] ABSTRACT

Tobacco based smoking mixture is disclosed with a pure-fat-free protein added to mask the unpleasant character of carbohydrate smoke. The off-notes or odours which the protein give rise to are in turn masked by a conjugated polyunsaturated iso-prenoid additive.

8 Claims, No Drawings

TOBACCO COMPOSITION

This invention relates to an improved smoking mixture.

More particularly, but not exclusively, the invention relates to an improved smoking mixture based on reconstituted tabacco. The reconstituted tobacco may be of the many types described in the reconstituted tobacco prior art.

In a copending application we describe how the addition of protein and a conjugated polyunsaturated isoprenoid or derivatives thereof to a smoke-producing substrate which may be carbohydrate, modified carbohydrate or certain aldol condensation products improves the smoke flavour of said substrate.

Another co-pending application indicates that protein alone serves to reduce or eliminate the intensity of the off-odours and off-flavours of the smoke from the smoke producing substrate and also imparts a tobacco-like flavour and after-taste to the smoke. Such an improved smoking mixture containing protein to mask the unpleasant character of the carbohydrate smoke is not, however, entirely satisfactory since the protein itself can give rise to off-notes or odours. The inclusion of a conjugated polyunsaturated isoprenoid such as carotene in the protein containing smoking mixtures serves to mask the protein off-notes of the smoke from the said mixture and, moreover, imparts a fresh vegetable-like effect to the protein containing smoking mixture. We suspect a synergistic effect between the protein and the conjugated polyunsaturated isoprenoid or derivative thereof.

We have also discovered that this advantageous synergistic effect is obtained when protein and a conjugated polyunsaturated isoprenoid or derivative thereof are added to tobacco per se, advantageously reconstituted tobacco. Furthermore, the presence of ionone rings at the end of the hydrocarbon chains of the isoprenoid enhances the aforesaid vegetable effect.

In accordance with the present invention there is provided a smoking mixture comprising tobacco, protein and a conjugated polyunsaturated isoprenoid or derivative thereof such as acids or esters.

The ratio of conjugated polyunsaturated isoprenoid to protein is in the range 1:3 to 1:60, preferably 1:10 to 1:50.

The ratio of protein to tobacco in the mixture is 1:2 to 1:50, preferably 1:8 to 1:26.

Further preferably, the tobacco is in the form of reconstituted tobacco.

The smoking mixture of the invention may comprise 0.5 to 25 percent by weight of protein and up to 4 percent by weight of the polyunsaturated isoprenoid or derivative thereof, the remainder being made up of tobacco, additives and fillers.

The smoking mixtures of the invention may, in addition to protein, conjugated polyunsaturated isoprenoid and reconstituted tobacco, contain other ingredients such as are normally used in smoking mixtures to impart desired physical properties and burning characteristics. For example, the mixtures may comprise glow-controlling catalysts, materials to improve ash coherence and colour, nicotine, flavourants, medicaments or humectants and film-forming binding agents.

Alkali metal compounds may advantageously be used as glow-controlling catalysts and salts of ammonia, alkali metals or alkaline earth metals may be used as ash improvers.

Alkali or alkaline earth carbonates or porous fillers may be incorporated in the smoking mixtures to give an open texture and facilitate combustion.

More particularly, additional compounds may comprise:

1. Fillers - e.g. calcium carbonate, magnesium carbonate.
2. Humectants - e.g. glycerol, ethylene glycol, polyethylene glycol.
3. Film-forming agents - e.g. methyl cellulose, sodium carboxymethyl cellulose, pectins, gums.
4. Glow-controlling catalysts - e.g. potassium citrate, calcium carbonate, magnesium carbonate.
5. Ash cohesion agents - e.g. citric acid, sodium hydrogen phosphate, tobacco extracts.
6. Solanesol, other similar unconjugated polyisoprenoids and derivatives thereof (e.g. esters, acids and hydroxyl derivatives), may be added to obtain a sweetish aroma from the burning mixture and to give a pleasant afternote in the mouth of the smoker.

The smoking mixture may additionally contain as a minor component one or more carbohydrate materials such as cellulose fibre, starch or sugar, to improve flavour and physical properties.

We have further discovered that if the conjugated polyunsaturated isoprenoid contains ionone rings at the end of the hydrocarbon chains then the vegetable effect is enhanced.

The conjugated polyunsaturated isoprenoid is preferably a carotenoid. It may also be a Vitamin A derivative.

The carotenoid is preferably carotene or a carotene derivative. Suitable carotenoids include $\beta$-carotene, $\alpha$-carotene, admixtures of $\beta$- and $\alpha$-carotene with $\gamma$-carotene, lycopene, $15^1$, $15^1$-dehydro-$\beta$-carotene, $4,4^1$-diketo-$15,15^1$-dehydro-$\beta$-carotene, bixin, apocarotenal and apocarotenoic acid derivatives, canthanxanthin or other xanthophylls.

A naturally occurring isomeric mixture consisting of 85 percent $\beta$-carotene and 15 percent $\alpha$-carotene may advantageously be used but pure $\alpha$- or pure $\beta$-carotene is also suitable.

The protein should preferably be pure and it is desirable, but not essential, that any residual fat should be removed from the protein, for example, by extraction with an organic solvent. Especially valuable proteins include animal protein, for example, albumin, casein, gelatine, peptone, haemoglobin, wool protein and vegetable proteins, for example, protein from maize (zein), wheat, (glutin and gliadin), soyabean or ground nut.

Protein acid hydrolysates or protein enzyme hydrolysates, e.g. casein acid hydrolysate or casein enzyme hydrolysate, are also suitable for the purpose of the invention.

The carotene or other conjugated polyunsaturated isoprenoid is advantageously sprayed from solution on to the reconstituted tobacco containing protein.

The invention is further illustrated by the following Examples in which all parts and percentages are by weight. In each of the Examples the flavour and after-taste of the product were assessed by a panel of smokers. Furthermore, in each of the Examples, those ingredients which are not soluble are to be considered as being finely divided.

EXAMPLE 1

1.34 parts of glycerol and 0.78 part of potassium citrate dissolved in 4 parts distilled water were mixed with 1.92 parts of sodium carboxymethyl cellulose dissolved in 96 parts hot distilled water. 6.73 parts of magnesium carbonate (magnesite), 3.86 parts of calcium carbonate, 0.2 part of the protein casein (extracted for 48 hours with petroleum ether at 30°C) and 5.18 parts of ball-milled tobacco were added to the above mixture and the whole stirred until homogeneous (about 1 hour)

The slurry was cast on glass plates and dried to give a film 0.006 in. thick which was removed from the plates, cut and shredded. The shred was sprayed with a solution of 0.02 part of $\beta$-carotene in 35 parts of carbon tetrachloride and the solvent allowed to evaporate. When the treated shred was made into cigarettes and smoked, it showed improved features of tobacco taste and after taste with some cigar character compared with compositions without protein and with protein but no $\beta$-carotene.

Example 2

1.34 parts of glycerol and 0.78 part of potassium citrate dissolved in 4 parts distilled water were mixed with 1.92 parts of sodium carboxymethyl cellulose dissolved in 96 parts hot distilled water. 6.73 parts of magnesium carbonate (magnesite) 3.86 parts of calcium carbonate, 0.6 part of the protein casein (extracted for 48 hours with petroleum ether at 30°C) and 4.78 parts of ball-milled tobacco were added to the above mixture and the whole stirred until homogeneous (about 1 hour).

The slurry was cast on glass plates and dried to give a film 0.006 in. thick which was removed from the plates, cut and shredded. The shred was sprayed with a solution of 0.04 part of $\beta$-carotene in 35 parts of carbon tetrachloride and the solvent allowed to evaporate. When the treated shred was made into cigarettes and smoked, it showed improved features of tobacco taste and aftertaste of cigar character compared with the composition containing 0.6 part of the protein casein but no $\beta$-carotene.

Example 3

1.34 parts of glycerol and 0.78 parts of potassium citrate dissolved in 4 parts distilled water were mixed with 1.92 parts of sodium carboxymethyl cellulose dissolved in 96 parts hot distilled water. 6.73 parts of magnesium carbonate (magnesite), 3.86 parts of calcium carbonate, 0.6 part of the protein casein (extracted for 48 hours with petroleum ether at 30°C) and 4.78 parts of ball-milled tobacco were added to the above mixture and the whole stirred until homogeneous (about 1 hour).

The slurry was cast on glass plates and dried to give a film 0.006 in. thick which was removed from the plates, cut and shredded. The shred was sprayed with a solution of 0.012 part of $\beta$-carotene in 35 parts of carbon tetrachloride, and the solvent allowed to evaporate. When the treated shred was made into cigarettes and smoked, it showed improved features of tobacco taste and after-taste of cigar character compared with the composition containing 0.6 part of the protein casein but no $\beta$-carotene.

Example 4

1.8 parts of glycerol dissolved in 4 parts of distilled water were mixed with 2.4 parts sodium carboxymethyl cellulose dissolved in 96 parts distilled water. 5.98 parts of magnesium carbonate (magnesite), 3.44 parts of calcium carbonate 0.4 parts of soya protein, 1 part bentonite and 4.98 parts ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.02 parts of carotene in 50 parts chloroform and the solvent allowed to evaporate. When the treated shred was made into cigarettes and smoked they showed improved features of tobacco taste and after-taste.

Example 5

1.8 parts of glycerol dissolved in 4 parts of distilled water were mixed with 2.4 parts of sodium carboxymethyl cellulose dissolved in 96 parts distilled water. 5.98 parts of magnesium carbonate (magnesite), 3.44 parts of calcium carbonate, 0.1 part casein protein, 1 part bentonite and 5.28 parts of ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.02 parts carotene in 50 parts chloroform, and the solvent allowed to evaporate. When the treated shred was made into cigarettes and smoked, they showed improved features of tobacco taste and after-taste.

Example 6

1.8 parts of glycerol dissolved in 4 parts of distilled water were mixed with 2.4 parts sodium carboxymethyl cellulose dissolved in 96 parts distilled water. 5.98 parts of magnesium carbonate (magnesite), 3.44 parts of calcium carbonate, 0.3 parts of soya protein, 1 part bentonite and 5.08 parts of ball-milled tobacco were added to the above mixture and the whole stirred until homogeneous (about 1 hours).

The slurry was cast on glass plates and dried to give a film 0.006 in. thick. The film was removed and shredded. The shred was sprayed with a solution of 0.04 parts apocarotenal in 50 parts chloroform and the solvent allowed to evaporate. When the treated shred was made into cigarettes and smoked they showed improved features of tobacco taste and after-taste.

Example 7

1.8 parts glycerol dissolved in 4 parts of distilled water were mixed with 2.4 parts sodium carboxymethyl cellulose dissolved in 96 parts distilled water. 5.98 parts of magnesium carbonate (magnesite), 3.44 parts of calcium carbonate, 0.3 parts casein protein, 1 part bentonite and 5.08 parts ball-milled tobacco were added to the above mixture and the whole stirred until homogeneous (about 1 hour).

The slurry was cast on glass plates and dried to give a film 0.006 in. thick. The film was removed and shredded. The shred was sprayed with 0.04 parts apocarotenal in 50 parts chloroform and the solvent allowed to evaporate. When the treated shred was made into cigarettes and smoked, they showed improved features of tobacco taste and after-taste.

Example 8

1.8 parts of glycerol dissolved in 4 parts of distilled water were mixed with 2.4 parts sodium carboxymethyl cellulose dissolved in 96 parts distilled water. 5.98 parts of magnesium carbonate (magnesite) 3.44 parts of calcium carbonate, 0.4 parts of zein protein, 1 part of bentonite and 4.98 parts ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.02 parts of carotene in 50 parts chloroform and the solvent allowed to evaporate. When the treated shred was made into cigarettes and smoked, they showed improved features of tobacco taste and after-taste.

Example 9

1.8 parts of glycerol dissolved in 4 parts of distilled water were mixed with 2.4 parts of sodium carboxymethyl cellulose dissolved in 96 parts distilled water. 5.98 parts of magnesium carbonate (magnesite) 3.44 parts of calcium carbonate, 0.3 parts of casein protein, 1 part of bentonite and 5.08 parts of ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.005 parts of carotene in 50 parts chloroform and the solvent allowed to evaporate. When the treated shred was made into cigarettes and smoked they showed improved features of tobacco taste and after-taste.

Example 10

1.8 parts of glycerol dissolved in 4 parts of distilled water were mixed with 2.4 parts of sodium carboxymethyl cellulose dissolved in 96 parts distilled water. 5.98 parts of magnesium carbonate (magnesite), 3.44 parts of calcium carbonate, 0.30 parts of casein protein, 1 part of bentonite and 5.08 parts of ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.08 parts carotene in 50 parts chloroform and the solvent allowed to evaporate. When the treated shred was made into cigarettes and smoked they showed improved tobacco taste and after-taste.

Example 11

1.8 parts of glycerol dissolved in 4 parts of distilled water were mixed with 2.4 parts of sodium carboxymethyl cellulose dissolved in 96 parts distilled water. 5.98 parts of magnesium carbonate (magnesite), 3.44 parts of calcium carbonate, 1.78 parts of casein protein, 1 part of bentonite and 3.6 parts of ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.02 parts carotene in 50 parts chloroform and the solvent allowed to evaporate. When the treated shred was made into cigarettes and smoked they showed improved features of tobacco taste and after-taste of a cigar nature.

Example 12

1.8 parts of glycerol dissolved in 4 parts of distilled water were mixed with 2.4 parts of sodium carboxymethyl cellulose dissolved in 96 parts distilled water. 2.32 parts of magnesium carbonate (magnesite), 1.3 parts of calcium carbonate, 5.0 parts of casein protein, 1 part of bentonite and 5.38 parts of ball-milled tobacco were added to the above mixture and the whole stirred until homogeneous (about 1 hour).

The slurry was cast on glass plates and dried to give a film 0.006 in. thick. The film was removed and shredded. The shred was sprayed with a solution of 0.8 parts carotene in 200 parts chloroform and the solvent allowed to evaporate. When the treated shred was made into cigarettes and smoked they showed improved features of tobacco taste and after-taste.

What we claim is:

1. A smoking mixture comprising as the essential ingredients reconstituted tobacco, pure, fat-free protein, selected from the group consisting of albumin, casein, gelatin, peptone, haemoglobim, wool, maize, wheat, soyabean, and ground nut proteins and a carotene hydrocarbon, the ratio of carotene hydrocarbon to protein being in the range 1:3 to 1:60 and the protein constituting from 0.5 to 25 percent by weight of the smoking mixture.

2. A smoking mixture as claimed in claim 1 wherein the ratio of carotene hydrocarbon to protein is 1:10 to 1:50.

3. A smoking mixture as claimed in claim 1 wherein the ratio of protein to tobacco in the mixture is 1:8 to 1:26.

4. A smoking mixture as claimed in claim 1 comprising up to 4 percent by weight of carotene hydrocarbon.

5. A smoking mixture as claimed in claim 1 wherein the carotene hydrocarbon is carotene or a carotene derivative.

6. A smoking mixture as claimed in claim 5 wherein the carotene hydrocarbon is $\alpha$-carotene, $\beta$-carotene, admixtures of $\alpha$- and $\beta$-carotene with $\gamma$-carotene, lycopene, $15^1,15^1$-dehydro-$\beta$-carotene, $4,4^1$-diketo-$15,15^1$-dehydro-$\beta$-carotene, bixin, apocarotenal and apocarotenoic acid derivatives, canthanxanthin or other xanthophylls.

7. A smoking mixture as claimed in claim 5 wherein the carotene hydrocarbon is a naturally occurring isomeric mixture consisting of 85 percent $\beta$-carotene and 15 percent $\alpha$-carotene.

8. A smoking mixture as claimed in claim 1 wherein the protein is animal or vegetable protein.

* * * * *